(12) United States Patent
Neufeldt et al.

(10) Patent No.: US 11,346,919 B2
(45) Date of Patent: May 31, 2022

(54) SYSTEM AND METHOD FOR DETERMINING THE POSITION OF AN AIRCRAFT

(71) Applicant: Thales Management & Services Deutschland GmbH, Ditzingen (DE)

(72) Inventors: Holger Neufeldt, Vaihingen/Enz (DE); André Schuettpelz, Sachsenheim (DE)

(73) Assignee: Thales Management & Services Deutschland GmbH, Ditzingen (DE)

( * ) Notice: Subject to any disclaimer, the term of this patent is extended or adjusted under 35 U.S.C. 154(b) by 210 days.

(21) Appl. No.: 16/681,088

(22) Filed: Nov. 12, 2019

(65) Prior Publication Data
US 2020/0150214 A1    May 14, 2020

(30) Foreign Application Priority Data

Nov. 13, 2018  (EP) ..................................... 18205943

(51) Int. Cl.
G01S 5/06    (2006.01)
G01S 5/02    (2010.01)

(52) U.S. Cl.
CPC .............. *G01S 5/06* (2013.01); *G01S 5/0226* (2013.01)

(58) Field of Classification Search
CPC ................................ G01S 5/06; G01S 5/0226
USPC ........................................................ 342/462
See application file for complete search history.

(56) References Cited

U.S. PATENT DOCUMENTS

| | | | | |
|---|---|---|---|---|
| 3,430,234 A | | 2/1969 | Wright | |
| 5,099,245 A | * | 3/1992 | Sagey | ....................... G01S 5/06<br>342/357.2 |
| 7,136,016 B1 | * | 11/2006 | Swensen | .................... G01S 5/14<br>342/455 |
| 8,386,175 B2 | * | 2/2013 | Limbaugh | ............ G08G 5/0013<br>701/485 |
| 9,429,655 B2 | * | 8/2016 | Yun | ........................... G01S 5/06 |
| 10,591,609 B1 | * | 3/2020 | Pierro | ..................... G01S 19/18 |
| 2005/0200501 A1 | * | 9/2005 | Smith | ................... G01S 13/781<br>340/963 |
| 2010/0026525 A1 | * | 2/2010 | Feyereisen | ............. G01C 5/005<br>340/972 |
| 2010/0149019 A1 | | 6/2010 | Smith et al. | |
| 2018/0196140 A1 | | 7/2018 | Garcia et al. | |

OTHER PUBLICATIONS

Non-translated European Search Report of Priority Application, dated May 24, 2019, pp. 1-8.

* cited by examiner

*Primary Examiner* — Harry K Liu
(74) *Attorney, Agent, or Firm* — Bond Schoeneck & King, PLLC; George McGuire (57) ABSTRACT

A system for determining the position of an aircraft comprises an emitter arranged at the aircraft for emitting a signal, at least two receivers arranged at different locations for receiving the signal emitted by the emitter, and an evaluation device which is designed to determine an aircraft position based on the known positions of the receivers at the time of the reception of the signal and on a characteristic of the signal emitted by the emitter and received by the receivers. The invention proposes that at least one of the receivers is located above the aircraft, and that the evaluation means is designed to determine a vertical position (ALT) of the aircraft from the signal received by the receivers and the known positions of the receivers.

15 Claims, 6 Drawing Sheets

SYSTEM AND METHOD FOR DETERMINING THE POSITION OF AN AIRCRAFT

CROSS-REFERENCES TO RELATED APPLICATIONS

This application claims priority to European Patent Application No. 18 205 943.6-1206 filed on Nov. 13, 2018, the disclosure of which is incorporated herein by reference in its entirety.

BACKGROUND

The present invention refers to a system and a method for determining the position of an aircraft according to the independent claims.

Surveillance systems in air traffic control are typically designed to detect and/or measure horizontal position of aircraft. For example, secondary surveillance radar ("SSR") technology determines range and azimuth to an aircraft. Wide area multilateration (WAM) is an aircraft surveillance technology based on the so called time difference of arrival (TDOA) principle. With known wide area multilateration several ground receiving stations listen to signals transmitted from an aircraft. Then the two-dimensional horizontal location of the aircraft is mathematically calculated as the intersection of hyperboloids calculated from the measured time differences of arrival (e.g. in the case that the distances between the aircraft and all ground receiving stations are the same, the time differences of arrival would be zero). The vertical position (altitude) of an aircraft typically is determined by using barometric pressure. This vertical position is transmitted to air traffic control.

For wide area multilateration in aviation the signals emitted by a transponder-type emitter which is arranged in an aircraft are used. These transponder-type emitters may emit a signal as a reply to a dedicated interrogation signal received from a secondary surveillance radar system. Alternatively, such an emitter may emit a signal at certain points in time, for example regularly. An example of a secondary surveillance radar system and a method for using the signals by way of multilateration is described in WO 2010/142768 A1.

Another type of surveillance system in air traffic control is the so-called bistatic radar. Such a bistatic radar system uses a radar emitter emitting a signal for example to a radar transponder of an aircraft, which responds to the reception of the signal of the radar emitter by emitting itself a signal, which is received by a receiver spaced apart from the radar emitter at a known position. The position of the aircraft is then calculated using the travel times of the signal from the radar emitter to the aircraft and from the aircraft to the receiver. The aircraft position is on an ellipse having the radar emitter and the receiver in its foci.

SUMMARY OF THE INVENTION

It is an object of the present invention to provide a system and a method which allow a further enhanced determination of the position of an aircraft.

To solve this object the present invention suggests a system and a method comprising the features of the independent claims. Advantageous embodiments of the invention are claimed in the dependent claims. Further important features are described in the below specification and are shown in the attached figures.

More specifically, according to the invention a system for determining the position of an aircraft comprises an emitter arranged at the aircraft for emitting a signal. Such an emitter may be realized by a standard aircraft transponder operating with SSR mode A/C, mode S or mode S with extended squitter signals, all such signals comprising also an identifier allowing to clearly identify the emitter and the aircraft, respectively.

The system of the invention further comprises at least two receivers arranged at different and known locations for receiving the signal emitted by the emitter.

Part of the inventive system also is an evaluation device which is designed to determine an aircraft position based on the known positions of the receivers at the time of the reception of the signals and on a characteristic of the signal emitted by the emitter and received by the receivers. The invention specifically proposes that at least one of the receivers is located above the aircraft, and that the evaluation means is designed to determine a vertical position of the aircraft from the signals received by the receivers and the known positions of the receivers.

Other than classic systems, the inventive system provides the advantage to allow for the determination of a vertical position, that is an altitude and/or height of the aircraft. The proposed evaluation device may be a computer. It may be remote from the receivers and communicate with the receivers in order to evaluate the position of the receivers at the time of the reception of the signals and the characteristic of the signal emitted by the aircraft emitter and received by the receivers. For communication, a hard wired and/or wireless data link may be used. For example, the evaluation device may be arranged in an air traffic control center.

As indicated above, at least one of the receivers is located above the aircraft. "Above" the aircraft does not mean at all that the receiver is located exactly vertically to the aircraft but rather means that the receiver is arranged anywhere at a level which is higher than the level of the aircraft. That is that the receiver has a vertical distance to the aircraft, but may of course also have a lateral distance to the aircraft. "Vertical" and "lateral" are related to the earth surface and a typical earth related coordinate system. Analogous considerations apply to the term "below".

With the claimed and described invention it becomes possible to not only determine a horizontal position of an aircraft by means of the signals received by the receivers and the known positions of the receivers but to determine the vertical position of such an aircraft, for example the altitude of an aircraft above mean sea level (MSL) by this technical principle. Therefore, it is possible to determine the vertical position of an aircraft independent from a measurement of a barometric altitude or from a measurement by means of radar techniques, for example primary radar techniques, or from GPS techniques or classical multilateration (MLAT) with very limited vertical accuracy due to the limited resolution (radar) or geometry (MLAT).

Especially with respect to aviation and air traffic control, the invention enhances and eases manoeuver tracking of airborne targets and allows for an aircraft altimeter verification without the need for special flight tests. It allows for aircraft independent determination of an aircraft's altitude. Also, this provides the capability to verify and monitor the vertical aircraft separation. If applied in general in a certain airspace it may even allow to reduce vertical separation requirements.

This is essential for acceptance and sustained growth of air traffic and thus will ensure the further need for air traffic control equipment. Also, with the claimed invention it will be possible to detect violations of air space ("intrusion detection") without the need for specially equipped aircraft.

According to a preferred embodiment of the invention the system is operated with the principles of multilateration, wherein the characteristic of the signal processed by the evaluation means for determining the vertical position of the aircraft is a time of arrival (TOA) of the signal. As has been explained above, multilateration (MLAT) is a surveillance technique based on the measurement of the time differences of arrival (TDOAs) of a same signal emitted by an emitter at different receiving stations. When determining the time difference of arrival between two receiving stations one obtains an infinite number of possible locations of the emitter. When these possible locations are plotted as a two-dimensional representation, they form a hyperbolic curve (in the three-dimensional space they form a hyperboloid). To locate the exact location of the emitter along that curve, multilateration relies on multiple measurements: a second measurement taken to a different pair of receivers will produce a second curve, which intersects with the first, the intersection being the position of the aircraft where the signal was emitted.

More specifically, with a system using the principles of multilateration, the receivers each may have time measuring devices with which a respective time of arrival (TOA) of the signal can be determined in a synchronized time system. Furthermore, the evaluation device may be designed to determine time differences of arrival from the determined times of arrival, and to determine the vertical position of the aircraft from the time differences of arrival and the positions of the receivers at the respective times of arrival.

The receivers not only receive the signals but also receive the identifier. The term "synchronized time system" means that all receivers of the multilateration system would determine an identical time value of arrival if the signal was received at all receivers exactly at the same point of time.

Therefore, each of the receivers may have a clock as a time measuring device, and a clock error may be determined and removed in real-time as is well known for example from GPS systems. Additionally or alternatively time stamping based on a central or master clock at one central location (centralized timing system) may be applied. Also possible is the application of a distributed timing system using a synchronization of the distributed receiver based clocks to a reference time. Amongst others, the time reference distribution can be performed by:

RF-synchronization (1090 MHz or via independent PTP link);
GPS-sync,
reference transmitter on well-known position,
ADS-B itself In addition, the local time keeping clock may be composed of a local precision oscillator (like OCXO) or rubidium frequency standard or cesium clock.

The central evaluation or processing device collects and processes the data provided by the receivers, and may calculate target positions using differential multilateration methods. The results may be kept in a target list together with other target information that was obtained via Mode A/C/S data link. In addition to the always-present Mode A address (SSR code) and/or Mode S address these data may include the aircraft registration, callsign, aircraft type, barometric altitude, etc.

On a periodic base, target reports may be output for further processing by other air traffic control systems. Due to the applied principle of multilateration, the position results strongly depend on the geometry between the contributing receivers and the target aircraft.

According to a preferred embodiment the emitter is a secondary surveillance radar (SSR) transponder of an aircraft. Such an emitter is very reliable and standard or even mandatory equipment of a huge number of aircrafts.

According to a further preferred embodiment at least one of the receivers is capable to interrogate the radar transponder of the aircraft. This means that for example a message may be sent by a satellite to the aircraft transponder in order to trigger a reply message. Based on the time of transmission by the satellite and the time of reception of the reply from the aircraft (plus transponder delay, etc.) a range can be determined. The line of position is then a sphere compared to the hyperboloid resulting from the TDOA-principle. This allows for more degrees of freedom in the vertical plane and allows to get more information from the aircraft.

According to a further preferred embodiment, the at least one receiver located above the aircraft is an ADS-B receiver. This further reduces the cost of the system according to the invention.

According to a further preferred embodiment, the system may be operated with the principles of bistatic range determination, e.g. bistatic radar, wherein the characteristic of the signal processed by the evaluation means for determining the vertical position of the aircraft is a travel time of the signal. Such a bistatic radar system may use a ground based, airborne or space based radar emitter emitting a signal for example to a radar transponder of an aircraft, which may respond to the reception of the signal of the radar emitter by emitting itself a signal, which is received by a receiver spaced apart from the radar emitter at a known ground based, airborne or space based position.

While in literature multilateration and bistatic technologies may be mentioned as being one and the same or at least may be combined, such as "bistatic multilateration" using two transmitter-receiver-pairs, each pair generating an isorange contour (an ellipse) for each target it detects, in the context of the present invention the term "multilateration" is used for a technology determining a position (or range) of a target based on differences of the times of arrival of the same signal at different receivers. In contrast hereto, in the context of the present invention the term "bistatic range determination" is used for a technology determining a position (or range) of a target based on travel times of a signal emitted by an emitter and received at different receivers.

The position of the aircraft is then calculated using the travel times of the signal from the radar emitter to the aircraft and from the aircraft to the receiver. The aircraft position is on an ellipse having the radar emitter in the one focus and the receiver in the other focus. A vertical position can be determined by using two spaced apart receivers which results in the calculation of two ellipses which intersect in the vertical position of the aircraft.

The aircraft based emitter may emit a 1090 MHz Mode A/C/S signal. In case it is a radar transponder, at least one of the receivers may be capable to interrogate the radar transponder of the aircraft and thus to trigger the emission of the signal.

According to a particularly preferred embodiment of the invention the system is operated both with the principles of multilateration, wherein the characteristic of the signal processed by the evaluation means for determining the vertical position of the aircraft is a time of arrival of the signal, and with the principles of bistatic radar, wherein the characteristic of the signal processed by the evaluation means for determining the vertical position of the aircraft is a travel time of the signal. The combination of both principles for determining the position of the aircraft considerably enhances reliability and position, because the hyperbolic lines of position obtained with the principles of multilateration and the elliptical lines of position obtained with the principles of bistatic radar intersect at an angle of 90°.

According to a further preferred embodiment the system comprises a ground based test emitter or transceiver having a known and usually stationary position and being usable for verifying a clock synchronization of the receivers and/or compensating a clock synchronization error of the receivers. Such a test emitter in fact may simulate an aircraft based emitter and has the advantage that its position (vertical and horizontal) is exactly known, which means that also the vertical and horizontal distances between this test emitter and the receivers are exactly known. A calculated vertical and/or horizontal position of the emitter using the principles of multilateration and/or of bistatic range determination therefore may be compared to the actual position, and from the differences a clock synchronization may be verified and/or a clock synchronization error of the receivers may be compensated. This allows to further enhance the accuracy of the determination of the vertical and/or horizontal aircraft position.

According to a further preferred embodiment the at least one receiver located above the aircraft is located on board a satellite or an aircraft or a drone or a stratospheric balloon. There is a growing number of satellites equipped with ADS-B receivers able to receive signals emitted by aircraft transponders and able to determine the time of arrival of each such signal. These satellites build a network of satellites having the capability to detect ADS-B signals of aircrafts on a global scale. The exact positions of these satellites are known at any time. The ADS-B receivers on board these satellites are either intrinsically synchronized to a time system, for example UTC (Coordinated Universal Time) or the satellite receiver clock error is determined and removed in real time (for instance with redundant measurements) by ground processing. However, the system proposed by the invention would also work in case the receiver located above the aircraft is on board another aircraft or a drone, which might be a high flying stratospheric drone such as an electrically driven drone powered by solar energy, or a stratospheric balloon.

According to a further preferred embodiment the at least one receiver arranged below or at a more or less similar level as the aircraft is fixedly arranged in the region of an earth surface. This allows for easy maintenance and repair and provides for low cost of the inventive system. Further, it provides for a maximum space wherein the vertical position of the aircraft can be determined with high accuracy. In combination with the above proposed receivers on board of satellites a system is created combining terrestrial receivers and space based receivers allowing for a vertical measurement and a three-dimensional geometry for wide area multilateration (WAM)/bistatic range determination enabling true high precision three-dimensional determination of an aircraft's position.

According to a further preferred embodiment the at least one receiver located below the aircraft is a receiver of a secondary radar (Mode-A/C/S-receiver) or an ADS-B receiver. ADS-B (Mode-S extended squitter) is typically included, but in general reception capability for 1090 MHz Mode A/C/S is needed. This further reduces the cost of the system according to the invention because nearly no further ground based equipment must be installed.

According to a further preferred embodiment of the method according to the invention the vertical position of the aircraft determined from the signals received by the receivers and the known positions of the receivers is compared by means of an automatic comparison device with at least one vertical position of the aircraft determined in another way, and when the difference between the vertical position determined from the signals received by the receivers and the known positions of the receivers and the vertical position determined in another way reaches and/or exceeds a limit value, an action is initiated by means of an automatic action initiating device.

The mentioned automatic comparison device may be a computer, and the mentioned automatic action initiating device may also be a computer, in an exemplary embodiment the same computer as the automatic comparison device. This embodiment allows to calibrate the other method determining the vertical position of the aircraft, and/or allows to verify and monitor the vertical position, that is the altitude, of the aircraft determined by the other method. This allows for redundant determination of an aircraft altitude and enhancing aircraft surveillance.

According to a preferred embodiment of the method according to the invention the vertical position of the aircraft determined by the other method is a barometric altitude or a GPS altitude of the aircraft. Such a barometric altitude or GPS altitude preferably is transmitted to air traffic control also by the same signal used for multilateration and/or bistatic range determination. With the inventive method, it is possible to check, for example in regular time intervals, the transmitted barometric altitude or GPS altitude and thus detect wrong barometric or GPS altitude indications. Such wrong altitude indications may be unintentionally, for example due to a defect of the transponder or the altitude measurement equipment on board the aircraft, or intentionally, for example in the case of an aircraft used for a terrorist attack. The inventive method therefore allows to considerably enhance aviation safety. From a determined difference the pressure distribution in the atmosphere could be determined under the assumption of a correct space based ADS-B.

Furthermore, the principle may be extended to detect either GPS-errors, barometric altitude errors or errors of the altitude determined by the inventive method based on a two out of three decision: Because of the inventive system and method, three altitude indicative sources may be provided, namely barometric altitude, GPS-altitude, and altitude determined by the inventive method. When two of the three provide congruent information it can be decided that this congruent information can be trusted. If one information (and only one) deviates this will be detected as erroneous and flagged (notification issued to responsible+warning to air traffic controller).

BRIEF DESCRIPTION OF THE DRAWINGS

An exemplary embodiment of the invention is now explained with respect to the attached drawing. In the drawing show FIG. 1 a schematic representation of a multilateration system for determining the vertical position of an aircraft, FIG. 2 a schematic representation showing the principles of multilateration, FIG. 3 a schematic representation of a disadvantageous arrangement of receivers, FIG. 4 a schematic representation of an advantageous arrangement of receivers, FIG. 5 a schematic representation of the principles of bistatic radar, FIG. 6 a schematic representation similar to FIG. 5 showing a test emitter for verifying a clock synchronization, and FIG. 7 a flowchart of a method for determining the vertical position of an aircraft.

Functionally equivalent elements and regions in different embodiments are denoted hereinafter with the same reference numerals.

DETAILED DESCRIPTION

Figure 1:
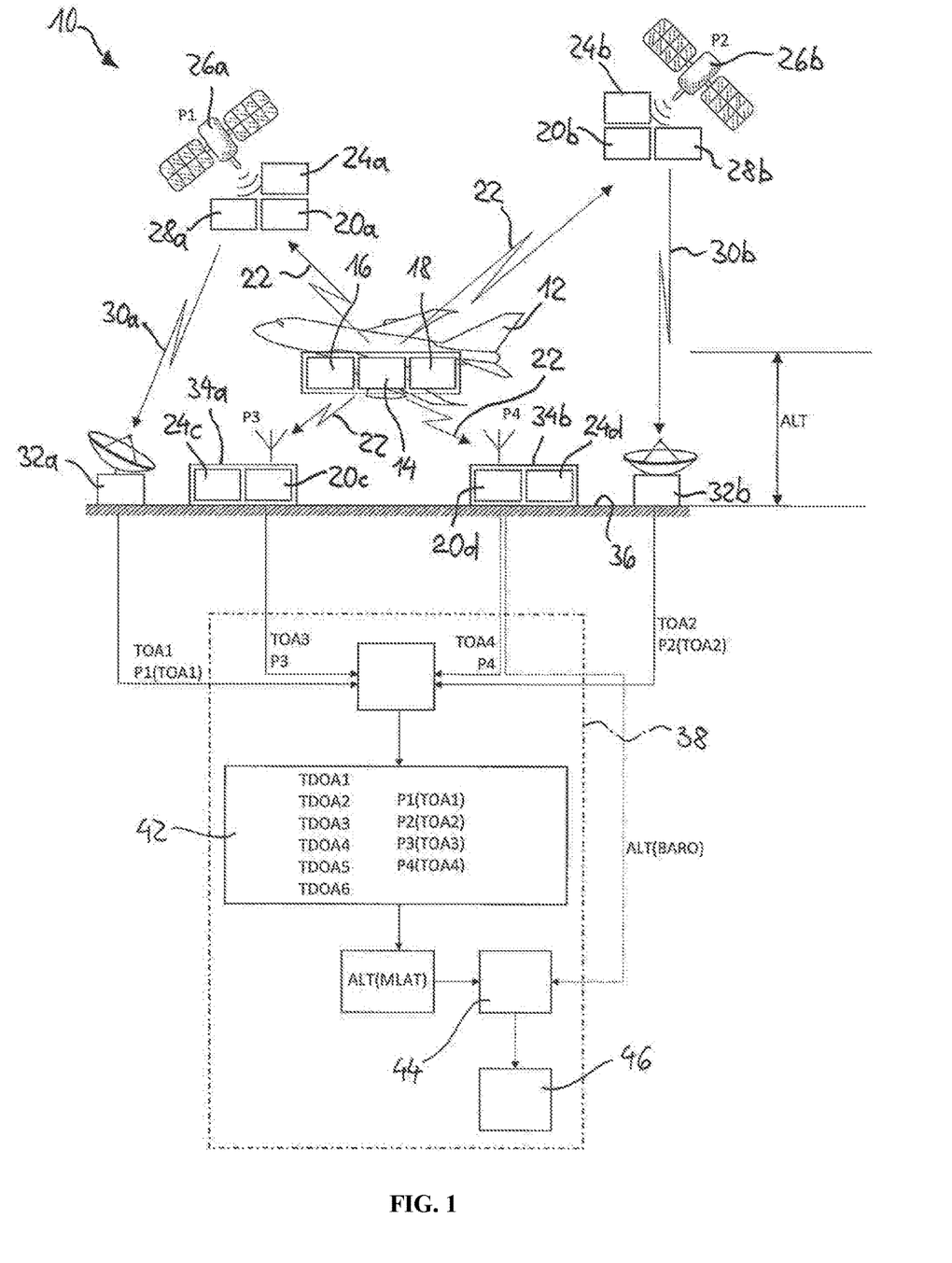

A system for determining the position of an aircraft is generally denoted with reference numeral 10 in FIG. 1. The aircraft itself is denoted with reference numeral 12. In FIGS. 1 to 4, the system 10 uses the principles of multilateration, as will be explained below.

The exemplary multilateration system 10 of FIG. 1 comprises an emitter 14 arranged on board the aircraft 12 for emitting a signal. Such an emitter 14 may be realized by a standard aircraft radar transponder operating with SSR mode A/C, mode S or mode S with extended squitter signals, all such signals comprising also an identifier allowing to clearly identify the emitter and the aircraft, respectively. When operating with SSR mode C, mode S or mode S with extended squitter signals, the emitter 14 may also emit a value of the barometric altitude ALT(BARO) measured with a barometric altitude measuring device such as an altimeter 16.

The identifier may be a 4-digit transponder code ("squawk") inputted by a pilot of the aircraft 12 by means of an input device 18 into the emitter 14 as requested by air traffic control. In the case of mode S or mode S with extended squitter signals the identifier may be an ICAO 24 bit address ("hex code") attributed to each aircraft and being unique for almost each aircraft in the world (only military aircraft share mode S addresses). The signal which is emitted by the emitter 14 has the reference numeral 22.

In the present exemplary embodiment the multilateration system 10 further comprises four receivers 20*a-d* arranged at different locations P1-P4 for receiving the same signal 22 emitted by the emitter 14, the receivers 20*a-d* each having time measuring devices 24*a-d* with which a respective time of arrival (TOA) of the signal 22 can be determined in a synchronized time system. The receivers 20*a-d* do not only receive the signals 22 but also receive the above mentioned identifier. The receiver 20*a* receives the signal 22 at a time of arrival TOA1, the receiver 20*b* receives the signal 22 at a time of arrival TOA2, and so on.

The term "synchronized time system" means that the time measuring devices 24*a-d* all indicate the same time. This means e.g. that the receivers 20*a-d* of the multilateration system 10 would determine an identical value of time of arrival TOA if the signal was received at all receivers 20*a-d* exactly at the same point of time, that is if the respective distances between the emitter 14 and the receivers 20*a-d* were absolutely identical. Therefore, each of the receivers 20*a-d* may have a clock as a time measuring device 24*a-d*, and a clock error may be determined and removed in real-time as is well known for example from GPS systems.

Additionally or alternatively time stamping based on a central or master clock at one central location (centralized timing system) may be applied. Also possible is the application of a distributed timing system using a synchronization of the distributed receiver based clocks to a reference time. Amongst others, the time reference distribution can be performed by:

RF-synchronization (1090 MHz or via independent PTP link);
GPS-sync,
reference transmitter on well-known position,
ADS-B itself In addition, the local time keeping clock may be composed of a local precision oscillator (like OCXO) or rubidium frequency standard or cesium clock.

The receivers 20*a* and 20*b* are at a respective vertical level which is vertically above the aircraft 12 since they are arranged on board respective satellites 26*a* and 26*b*. In another not shown embodiment, one or more of the receivers 20*a* and 20*b* or both receivers 20*a* and 20*b* are on board another aircraft(s) flying above the aircraft 12 and/or on board one or more drone(s) flying above the aircraft 12 and/or on board one or more balloon(s) flying above the aircraft 12. Such a drone or balloon may be a high flying stratospheric drone or balloon, the balloon especially an electrically powered solar drone, the exact drone/balloon positions being known in real-time. The satellites 26*a* and 26*b* may be part of a plurality or even a multitude of satellites forming a satellite network distributed preferably all over the world. The satellites 26*a* and 26*b* may be geostationary satellites or may be satellites in a low orbit or any other orbit. Typically the receivers 20*a* and 20*b* on board of satellites 26*a* and 26*b* are ADS-B receivers.

As can be seen from FIG. 1, "above" the aircraft 12 does not mean that the receivers 20*a* and 20*b* are located exactly vertically to the aircraft 12 but rather means that the receivers 20*a* and 20*b* are arranged anywhere at an altitude level above the earth surface 36 which is higher than the altitude level of the aircraft 12. As is shown in FIG. 1, the receivers 20*a* and 20*b* also have a lateral distance to the aircraft. "Vertical" and "lateral" are related to an earth surface 36. Analogous considerations apply to the term "below" which will be used hereinafter.

The satellites 26*a* and 26*b* each comprise an emitter 28*a* and 28*b* for emitting a signal 30*a* and 30*b*, respectively, to a respective ground receiving station 32*a* and 32B. As shown in FIG. 1, receivers 20*c* and 20*d* are located below the aircraft 12. More specifically, receivers 20*c* and 20*d* are ground based receivers of a secondary radar station 24*a* and 24*b* (SSR) arranged on the earth surface 36. In a non-shown embodiment one of the ground based receivers or both ground based receivers may be ADS-B receivers. Further, in a non-shown embodiment the ground based receivers may be remote from the secondary radar stations.

Part of the multilateration system 10 is an evaluation device 38 which comprises a first processing means 40 designed to determine time differences of arrival TDOA1-TDOA6 from the times of arrival TOA1-TOA4 determined at the respective receivers 20*a* to 20*d*. The time difference of arrival TDOA1 is the numerical difference between on the one hand the time of arrival TOA1 of the signal 22 at the receiver 20*a* on board satellite 26*a* and on the other hand the time of arrival TOA2 of the signal 22 at the receiver 22*b* on board satellite 26*b*. The time difference of arrival TDOA2 is the numerical difference between on the one hand the time of arrival TOA2 of the signal 22 at the receiver 20*b* on board satellite 26*b* and the time of arrival TOA3 of the signal 22 at the receiver 20*c* at secondary radar station 34*a*, and so on. With the present amount of four receivers 20*a*-20*d* six time differences of arrival TDOA1-TDOA6 may be calculated.

The evaluation device 38 may be a computer and the first processing means 40 may be realized by a software module. The evaluation device 38 may be remote from the ground receiving stations 32a and 32b and from the secondary radar stations and 34a and 34b and may be located for example in an air traffic control center (not shown). It communicates with the ground receiving stations 32a and 32b and the secondary radar stations 34a and 34b preferably by means of a glass fiber data link. Of course, any other type of hard wired or wireless data link is possible.

The evaluation device 38 further comprises a second processing means 42 which also may be realized by a software module in the evaluation device 38 and which determines a vertical position ALT(MLAT) of the aircraft 12 above a standard level of the earth surface 36, e.g. mean sea level ("MSL", corresponding to an aircraft altimeter setting to a local QNH), using multilateration techniques. Alternatively or additionally, it may determine a vertical position of the aircraft 12 above ground (e.g. corresponding to an aircraft altimeter setting to a local QFE) or above a standard atmosphere (e.g. corresponding to an aircraft altimeter setting to 1013 hPa). The principles of multilateration are well known to the person skilled in the art and will be schematically explained later below with reference to FIG. 2.

For the determination of the vertical position ALT(MLAT) by multilateration techniques the second processing means 42 uses the time differences of arrival TDOA1-TDOA6 calculated in the first processing means 40 and the positions P1-P4 of the receivers 20a-20d at the respective times of arrival TOA1-TOA4 of the signal 22. The positions P3 and P4 of the secondary radar stations 34a and 34b in the present exemplary embodiment are stationary and therefore constant, whereas the positions P1 and P2 of the satellites 26a and 26b are variable and transmitted together with the times of arrival TOA1 and TOA2 by means of the signals 30a and 30b to the ground receiving stations 32a and 32B. It is evident that the time differences of arrival TDOA1-TDOA6 are normally unequal 0 because the distances between the aircraft 12 and the respective receivers 20a-d are different resulting in different values of times of arrival TOA1-TOA4.

Figure 2:
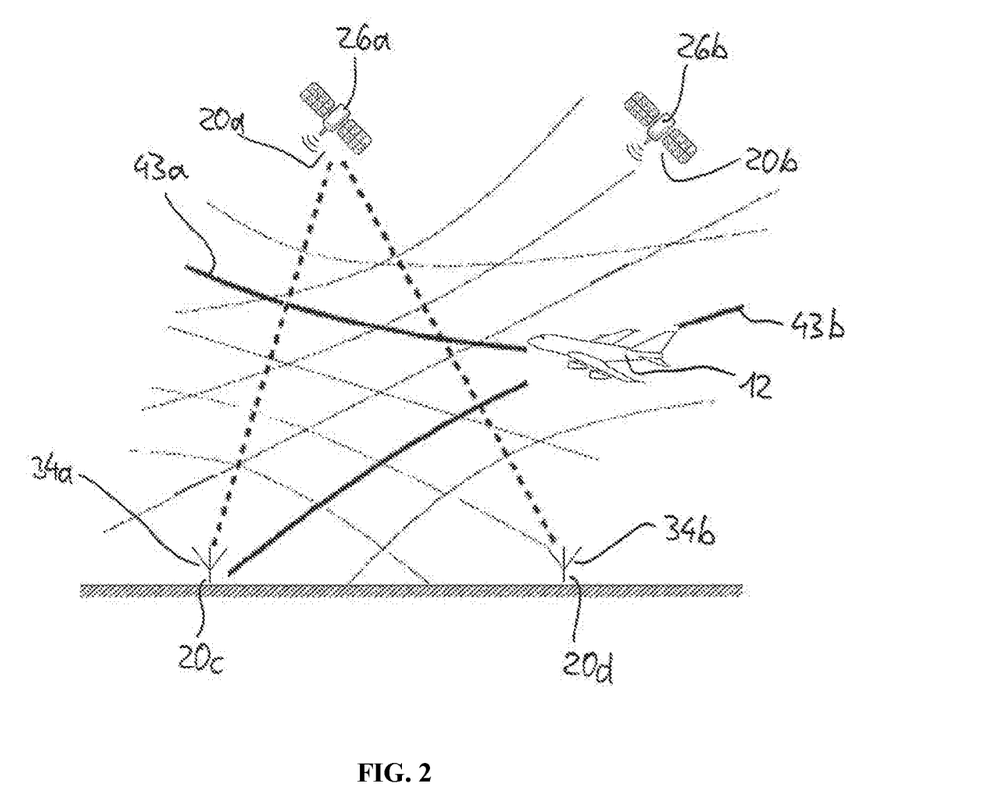

Now, a very short explanation of the principles of multilateration will be given with reference to FIG. 2: multilateration (MLAT) is a surveillance technique based on the measurement of the above mentioned time differences of arrival (TDOA1-TDOA6) of the signal 22 emitted by the emitter 14 at the different receivers 20-20d. When determining e.g. the time difference of arrival TDOA4 between the two receivers 20a and 20c one obtains an infinite number of possible locations of the emitter 14. When these possible locations are plotted as a two-dimensional representation, as is shown in FIG. 2, they form a hyperbolic curve 43a (in the three-dimensional space they form a hyperboloid). When determining e.g. the time difference of arrival TDOA5 between the two receivers 20a and 20d one obtains again an infinite number of possible locations of the emitter 14 forming a hyperbolic curve 43b. The intersection between curves 43a and 43b is the vertical position ALT(MLAT) of the aircraft 12. The accuracy is further enhanced by determining the further time differences of arrival TDOA1-TDOA4 resulting in further hyperbolic curves, these curves however not being shown in FIG. 2.

Of course, with the method described above it is not only possible to determine the vertical position of an aircraft. If respective receivers are not only arranged above and below the aircraft 12 but also beside and/or before and/or after the aircraft 12, also the exact horizontal position of the aircraft 12 may be determined by means of multilateration, resulting in a full three-dimensional position indication.

As is shown in FIG. 1, the evaluation device 38 further comprises an automatic comparison device 44 which also may be realized by a software module and which compares the vertical position ALT(MLAT) of the aircraft 12 determined by multilateration, as shown above, with a vertical position ALT(BARO) determined by the barometric altimeter 16 on board the aircraft 12 and transmitted also by the signal 22 (or, additionally or alternatively, with another vertical position determined by the barometric altimeter 16 when set to standard atmospheric pressure of 1013 hPa or to local QFE or local QNH). In a non-shown embodiment a GPS altitude is used additionally or instead of the barometric altitude.

The comparison in comparison device 44 is executed by calculating a difference between the altitude ALT(MLAT) obtained by multilateration and the barometric altitude ALT (BARO). If the calculated difference reaches or exceeds a limit threshold value, an automatic action initiating device 46 (again realized by a software module) initiates an action, for example issues and alarm provided to an air traffic controller. This allows the traffic controller for example to contact a pilot of the aircraft 12 informing him to check the aircraft altitude.

It is to be understood that the method executed by the comparison device 44 and the action initiating device 46 and/or the overall multilateration method may be executed only at certain time intervals, for example every few minutes or the like, in order to regularly monitor the actual vertical and preferably also the horizontal position of an aircraft indicated otherwise by another means, for example secondary surveillance radar (SSR) or ADS-B. It may be executed in shorter time intervals when the aircraft 12 is on a final approach to a runway of an airport, for example established on an ILS or an RNP approach.

As has been exemplary shown with reference to FIG. 1, the multilateration system 10 combines terrestrial (ground-based) receivers 22c and 22d and space based receivers 22a and 22b, each of the receivers 22a-22d able to receive the same signal 22 from the aircraft 12, and an evaluation means designed to use the times of arrival TOA1-TOA4 determined at the terrestrial and space-based receivers 22a-22d for determining a true high precision vertical and preferably also a horizontal position of the aircraft 12 by means of multilateration.

Figure 3:
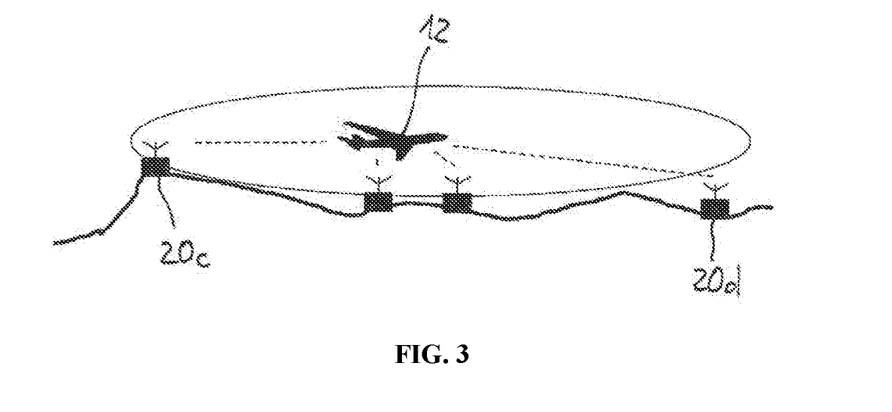
Figure 4:
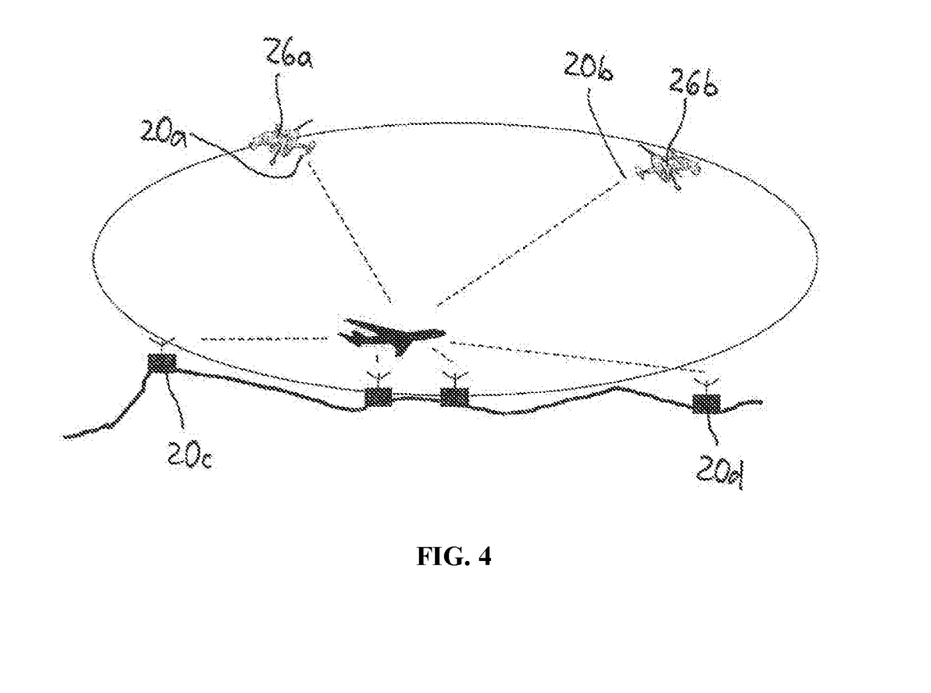

The representations of FIGS. 3 and 4 help to understand the advantage of the multilateration system 10 explained above. FIG. 3 shows a conventional arrangement of purely terrestrial receivers, amongst them the above mentioned receivers 20c and 20d, which allows to determine a horizontal position of the aircraft 12 by means of multilateration. However, this arrangement does not provide for a sufficient vertical accuracy due to geometrical constraints, because the hyperbolic curves on which the aircraft 12 is located and which are calculated from the time differences of arrival in a vertical plane are almost parallel (small intersection angle) and therefore cannot indicate sufficiently precise the vertical position of the aircraft 12.

In contrast hereto, FIG. 4 shows a combined arrangement of terrestrial and space based receivers, amongst them the above mentioned receivers 20a and 20b on board satellites 26a and 26b, which allows additionally to determine the vertical position of the aircraft 12 by means of multilateration with sufficient accuracy, because the hyperbolic curves on which the aircraft 12 is located and which are calculated from the time differences of arrival in a vertical plane now include hyperbolic curves which intersect each other with a relatively large intersection angle, wherein an intersection angle of 90° would constitute the optimum.

In a non-shown embodiment at least one of the receivers (on ground and/or in space) is capable to interrogate the radar transponder of the aircraft. This means that for example a message may be sent by a satellite to the aircraft transponder in order to trigger a reply message. Based on the time of transmission by the satellite and the time of reception of the reply from the aircraft (plus transponder delay, etc.) a range can be determined. The line of position is then a sphere compared to the hyperboloid resulting from the TDOA-principle. This allows for more degrees of freedom in the vertical plane and allows to get more information from the aircraft. The combination of hyperboloids (from TDOA) and ellipsoids allows for improved geometries.

Figure 5:
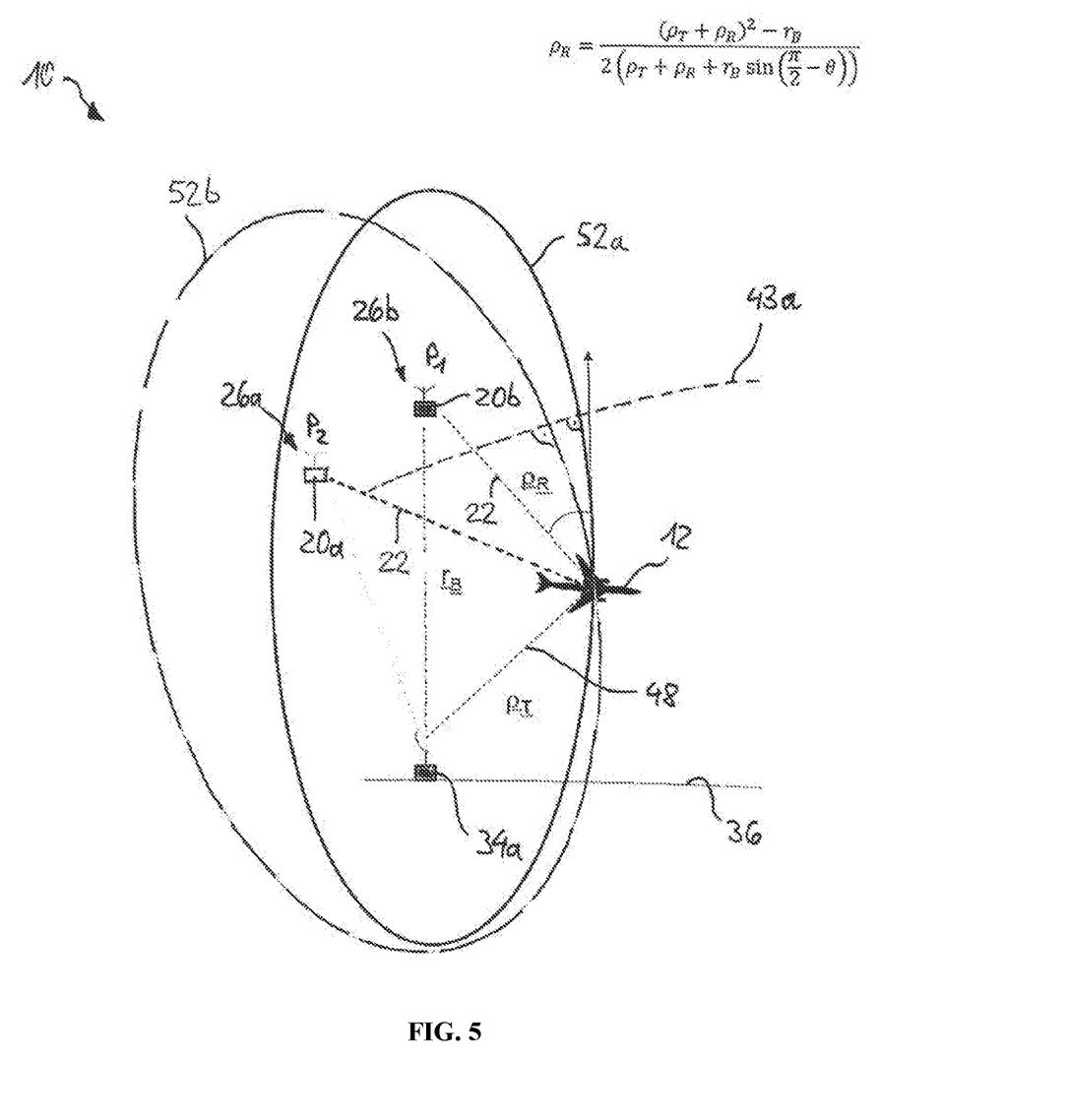

Reference is now made to FIG. 5 showing the principles of bistatic range determination, more specifically of bistatic radar.

FIG. 5 shows a ground based stationary secondary surveillance radar station 34a which emits a first signal 48 to the aircraft 12. The aircraft is equipped with a non-shown transponder comprising a receiver and an emitter, both not being shown in FIG. 5. The receiver on board the aircraft receives the first signal 48, which triggers the emitter on board the aircraft to send a second signal 22. The sent signal 22 is non-directional and therefore received both at space based receivers 20a and 20b on board respective satellites 26a and 26b. A travel time of the first signal 48 from the secondary surveillance radar 34a to the aircraft 12 is denoted with $\rho_T$, whereas a travel time of the second signal 22 from the aircraft 12 to the receiver 20b on board satellite 26b is denoted with $\rho_R$.

A non-shown evaluation device knows the exact time when the first signal 48 was sent from the secondary surveillance radar 34a, and also knows the exact time when the second signal 22 was received at the receiver 20b. The evaluation device now can calculate the overall travel time of the signal and may consider also a so called "transponder replay delay time" which is the time span needed by the transponder to process the reception of the first signal 48 and to initiate sending the second signal 22 which may be encoded with additional information such as transponder code, ICAO address, barometric altitude, et cetera.

On the basis of the calculated travel time, the evaluation device may determine a first elliptical curve 52a, the two foci of which being the locations of the secondary surveillance radar 34a and the receiver 20b on board satellite 26b at the time when the second signal 22 was received. The position of the aircraft 12 is somewhere on this first elliptical curve 52a.

In the same way, a second elliptical curve 52b may be determined on the basis of the same first and second signals 48 and 22, the second signal 22 however being additionally received by a second receiver 20a on board a second satellite 26a. The vertical aircraft position is being defined by the intersection of both elliptical curves 52a and 52b.

Figure 6:
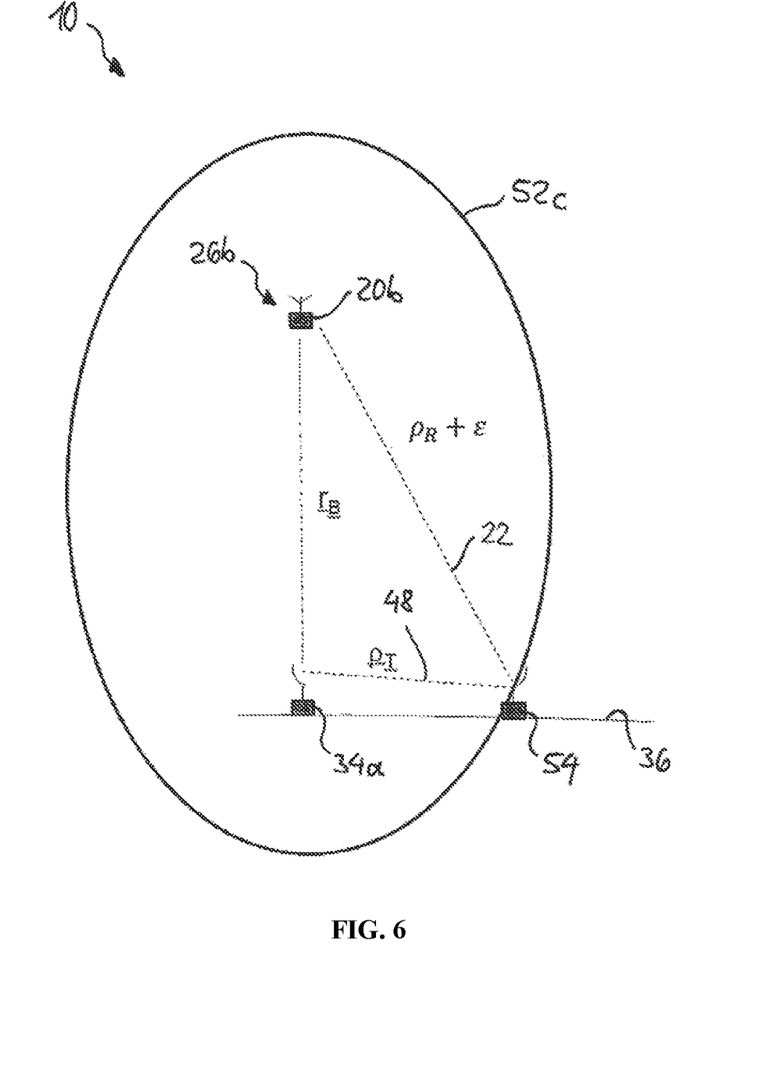

FIG. 6 shows an example of a bistatic radar were the clock synchronization of the receiver 20b on board satellite 26b is verified by a test emitter 54. Such a test emitter 54 may be similar to an aircraft based transponder, that is comprise a receiver and an emitter, but is located on the ground (earth's surface) 36 and is stationary, that is does not move with respect to the stationary secondary surveillance radar station 34a. By consequence, the relative position of the test emitter 54 and the secondary surveillance radar station 34a is known. Since the distance $r_B$ between the receiver 20b and the secondary surveillance radar station 34a, the distance $\rho_R$ between the test transmitter 54 and the receiver 20b, and the distance $\rho_T$ between the test transmitter 54 and the secondary surveillance radar station 34a all are known, a clock synchronization error c can be determined and used for the compensation of this clock synchronization error c in order to enhance the position determining accuracy.

Figure 7:
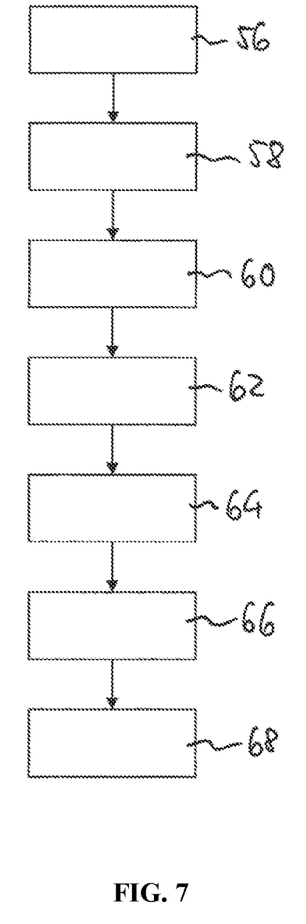

FIG. 7 is a flow chart of a method for determining a position of an aircraft. The method is initiated in a start block 56. In a block 58, a signal is emitted by means of an emitter located at the aircraft. In a block 60, one receiver for receiving the emitted signal is placed above the aircraft, preferably in space, for example on board a satellite. Furthermore, in block 60 another receiver for receiving the emitted signal is placed either also above the aircraft or below the aircraft, preferably on an earth surface. In a block 62, the emitted signal is received by means of the two receivers located at different locations. In a block 64, an aircraft position is determined based on the known positions of the receivers at the time of the reception of the signal and on a characteristic of the signal emitted by the emitter and received by the receivers. This characteristic may be a time of arrival and/or a travel time of the signal. In a block 66, a vertical position of the aircraft is determined from the signals received by the receivers and the known positions of the receivers. The method ends in an and block 68.

The invention claimed is:

1. A system for determining the position of an aircraft comprising
   an emitter arranged at the aircraft for emitting a signal,
   at least two receivers arranged at different locations (P1-4) for receiving the signal emitted by the emitter,
   an evaluation device which is designed to determine an aircraft position based on the known positions (P1-4) of the receivers at the time of the reception of the signal and on a characteristic of the signal emitted by the emitter and received by the receivers,
   characterized in that
   at least one of the receivers is located above the aircraft and at least one of the receivers is located below the aircraft and fixedly arranged in the region of an earth surface, and
   the evaluation means is designed to determine a vertical position (ALT) of the aircraft from the signal received by the receivers located above the aircraft and the receivers located below the aircraft and the known positions (P1-4) of the receivers,
   further characterized in that the system is operated with the principles of multilateration, wherein the characteristic of the signal processed by the evaluation means for determining the vertical position of the aircraft is a time of arrival (TOA) of the signal and wherein the receivers each comprise time measuring devices with which a respective time of arrival (TOA1-4) of the signal can be determined in a synchronized time system, wherein the evaluation device is designed to determine time differences of arrival (TDOA1-6) from the determined times of arrival (TOA1-4), and to determine a vertical position (ALT(MLAT)) of the aircraft from the time differences of arrival (TDOA1-6) and the positions of the receivers at the respective times of arrival (TOA1-4).

2. The system according to claim 1, characterized in that the at least one receiver located above the aircraft is an ADS-B receiver.

3. The system according to claim 1, characterized in that it is operated with the principles of bistatic range determination, wherein the characteristic of the signal processed by the evaluation means for determining the vertical position (ALT) of the aircraft is a travel time ($\rho_T+\rho_R$) of the signal.

4. The system according to claim 1, characterized in that the emitter is a radar transponder of the aircraft.

5. The system according to claim 4, characterized in that at least one of the receivers is capable to interrogate the radar transponder of the aircraft.

6. The system according to claim 1, characterized it is operated both with the principles of multilateration, wherein the characteristic of the signal processed by the evaluation means for determining the vertical position (ALT) of the aircraft is a time of arrival (TOA) of the signal, and with the principles of bistatic range determination, wherein the characteristic of the signal processed by the evaluation means for determining the vertical position (ALT) of the aircraft is a travel time ($\rho_T+\rho_R$) of the signal.

7. The system according to claim 1, characterized in that it comprises a ground based test emitter or transceiver having a known position and being usable for verifying a clock synchronization of the receivers and/or compensating a clock synchronization error ($\varepsilon$) of the receivers.

8. The system according to claim 1, characterized in that the at least one receiver located above the aircraft is located on board a satellite or another aircraft or a drone or a balloon.

9. The system according to claim 1, characterized in that at least one receiver is a receiver of a secondary radar or an ADS-B receiver.

10. A method for determining a position of an aircraft, comprising the steps:
  a. emitting a signal by means of an emitter located at the aircraft,
  b. receiving the emitted signal by means of at least two receivers located at different locations,
  c. determining an aircraft position based on the known positions of the receivers at the time of the reception of the signal and on a characteristic of the signal emitted by the emitter and received by the receivers,
  characterized in that it further comprises the steps of
  d. placing at least one of the receivers above the aircraft and at least one of the receivers below the aircraft,
  e. determining a vertical position (ALT) of the aircraft from the signals received by the receivers placed above the aircraft and the receivers placed below the aircraft and the known positions of the receivers,
  f. operating the system with the principles of multilateration, wherein the characteristic of the signal processed by the evaluation means for determining the vertical position of the aircraft is a time of arrival (TOA) of the signal and wherein a respective time of arrival (TOA1-4) of the signal is determined in a synchronized time system with time measuring devices comprised by the receivers;
  g. determining time differences of arrival (TDOA1-6) from the determined times of arrival (TOA1-4) with an evaluation device; and
  h. determining a vertical position (ALT(MLAT)) of the aircraft from the time differences of arrival (TDOA1-6) and the positions of the receivers at the respective times of arrival (TOA1-4) with the evaluation device.

11. The method according to claim 10, characterized in that it uses the principles of multilateration, wherein the characteristic of the signal for determining the vertical position (ALT) of the aircraft is a time of arrival (TOA) of the signal.

12. The method according to claim 10, characterized in that it uses the principles of bistatic radar, wherein the characteristic of the signal for determining the vertical position (ALT) of the aircraft is a travel time ($\rho_T+\rho_R$) of the signal.

13. The method according to claim 10, characterized in that the vertical position (ALT(MLAT)) of the aircraft determined from the signals received by the receivers and the known positions of the receivers is compared by means of an automatic comparison device with at least one vertical position (ALT(BARO)) of the aircraft determined by another method, and that when the difference between the vertical position (ALT(MLAT)) determined from the signals received by the receivers and the known positions of the receivers and the vertical position (ALT(BARO)) determined by the other method reaches and/or exceeds a limit value, an action is initiated by means of an automatic action initiating device.

14. The method according to claim 11, characterized in that the vertical position of the aircraft determined by the other method is at least one of a barometric altitude (ALT (BARO)) and a GPS altitude of the aircraft.

15. The method according to claim 10, characterized in that a GPS-error, barometric altitude error or vertical multilateration altitude error is detected based on a two out of three decision, wherein if one of these parameters deviates from the two other parameters and the two other parameters are at least almost congruent the deviating parameter will be classified as erroneous.

* * * * *